United States Patent
Briand et al.

(10) Patent No.: US 7,385,158 B2
(45) Date of Patent: Jun. 10, 2008

(54) METHOD AND INSTALLATION FOR LASER WELDING WITH A $N_2$/HE GAS MIXTURE, THE $N_2$/HE CONTENT BEING CONTROLLED ACCORDING TO THE LASER POWER

(75) Inventors: Francis Briand, Paris (FR); Karim Chouf, Levallois Perret (FR); Philippe Lefebvre, Meulan (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 10/501,269

(22) PCT Filed: Dec. 4, 2002

(86) PCT No.: PCT/FR02/04175

§ 371 (c)(1),
(2), (4) Date: Mar. 28, 2005

(87) PCT Pub. No.: WO03/057398

PCT Pub. Date: Jul. 17, 2003

(65) Prior Publication Data

US 2005/0167406 A1    Aug. 4, 2005

(30) Foreign Application Priority Data

Jan. 11, 2002    (FR)    ................................ 02 00326

(51) Int. Cl.
*B23K 26/20*    (2006.01)
*B23K 26/12*    (2006.01)

(52) U.S. Cl. .............................. 219/121.64; 219/121.84
(58) Field of Classification Search ........... 219/121.63, 219/121.64, 121.84
See application file for complete search history.

(56) References Cited

U.S. PATENT DOCUMENTS

| | | | | |
|---|---|---|---|---|
| 4,000,392 | A | * 12/1976 | Banas et al. | ........... 219/121.64 |
| 4,724,297 | A | 2/1988 | Nielsen | |
| 4,871,897 | A | 10/1989 | Nielsen | |
| 4,891,077 | A | 1/1990 | Roll et al. | |

(Continued)

FOREIGN PATENT DOCUMENTS

DE    36 19 513 A1    6/1986

(Continued)

OTHER PUBLICATIONS

Patent Abstracts of Japan; publication No. 01005692; publication date Jan. 10, 1989; application date Jun. 26, 1987; application No. 62159337.

(Continued)

*Primary Examiner*—Geoffrey S Evans
(74) *Attorney, Agent, or Firm*—Christopher J. Cronin

(57) ABSTRACT

A method and an apparatus for welding with a laser beam. A shielding gas mixture of nitrogen and helium is used and the proportions of the component gases are modified depending on the laser beam's power or power density. Plasma formation in the shield gas is minimized by increasing the proportion of helium as the laser beam's power or power density increases.

7 Claims, 3 Drawing Sheets

U.S. PATENT DOCUMENTS

| | | | |
|---|---|---|---|
| 4,945,207 A * | 7/1990 | Arai ..................... | 219/121.64 |
| 5,539,180 A * | 7/1996 | Mori et al. ............ | 219/121.64 |
| 6,060,687 A | 5/2000 | Faerber | |
| 6,281,472 B1 * | 8/2001 | Faerber ................ | 219/121.64 |
| 6,770,840 B2 * | 8/2004 | Minamida et al. ..... | 219/121.64 |
| 2002/0136507 A1* | 9/2002 | Musk ................... | 219/121.63 |
| 2004/0094522 A1 | 5/2004 | Herrmann | |

FOREIGN PATENT DOCUMENTS

| | | | |
|---|---|---|---|
| DE | 39 34 920 A1 | 10/1989 | |
| DE | 40 34 745 A1 | 10/1990 | |
| DE | 41 23 716 A1 | 7/1991 | |
| DE | 27 13 904 A1 | 3/1997 | |
| EP | 0 527 229 | 2/1993 | |
| JP | 61-232087 A * | 10/1986 | ............ 219/121.64 |
| JP | 9-220682 A * | 8/1997 | |
| JP | 2002-1569 A * | 1/2002 | |
| WO | WO 88 01553 | 8/1987 | |
| WO | WO 97 34730 | 3/1997 | |
| WO | WO 98 14302 | 9/1997 | |
| WO | WO 02 43918 | 6/2002 | |

OTHER PUBLICATIONS

Patent Abstracts of Japan; publication No. 01048692; publication date Feb. 23, 1989; application date Feb. 23, 1989; application No. 62205140.

Patent Abstracts of Japan; publication No. 02030389; publication date Jan. 31, 1990; application date Jul. 20, 1988; application No. 63178946.

Patent Abstracts of Japan; publication No. 56122690; publication date Sep. 26, 1981; application date Feb. 28, 1980; application No. 55024821.

Patent Abstracts of Japan; publication No. 62104693; publication date May 15, 1987; application date Oct. 31, 1985; application No. 60244750.

International Search Report for PCT/FR02/04175.

Danzer W. et al.: "*Laser im nebel*", Laser, Vulkan Verlag, Essen, DE, 1987, No. 1, pp. 32-36.

\* cited by examiner

METHOD AND INSTALLATION FOR LASER WELDING WITH A $N_2$/HE GAS MIXTURE, THE $N_2$/HE CONTENT BEING CONTROLLED ACCORDING TO THE LASER POWER

BACKGROUND

The present invention relates to a laser beam welding process using a gas mixture consisting of nitrogen and helium in proportions that are adjusted or adapted according to the power or power density of the laser device used.

In industry, it is known to use a laser beam to cut or weld one or more metal workpieces. In this regard, the following documents may be cited: DE-A-2 713 904, DE-A-4 034 745, JP-A-01048692, JP-A-56122690, WO 97/34730, JP-A-01005692, DE-A-4 123 716, JP-A-02030389, U.S. Pat. No. 4,871,897, JP-A-230389, JP-A-62104693, JP-A-15692, JP-A-15693, JP-A-15694, JP-A-220681, JP-A-220682, JP-A-220683, WO-A-88/01553, WO-A-98/14302, DE-A-3 619 513 and DE-A-3 934 920.

Laser welding is a very high-performance welding process as it makes it possible to obtain, at high speeds, very great penetration depths compared with other more conventional processes, such as plasma welding, MIG (Metal Inert Gas) welding or TIG (Tungsten Inert Gas) welding.

This is explained by the high power densities involved when focusing the laser beam by one or more mirrors or lenses in the joint plane of the workpieces to be welded, for example power densities that may exceed $10^6$ W/cm$^2$.

These high power densities cause considerable vaporization at the surface of the workpieces which, expanding to the outside, induces progressive cratering of the weld pool and results in the formation of a narrow and deep vapor capillary called a "keyhole" in the thickness of the plates, that is to say in the joint plane.

This capillary allows the energy of the laser beam to be directly deposited depthwise in the plate, as opposed to the more conventional welding processes in which the energy deposition is localized on the surface.

This capillary is formed from a metal vapor/metal vapor plasma mixture, the particular feature of which is that it absorbs the laser beam and therefore traps the energy within the actual capillary.

One of the problems with laser welding is the formation of a shielding gas plasma.

This is because this metal vapor plasma, by seeding the shielding gas with free electrons, may induce the appearance of a shielding gas plasma, which is prejudicial to the welding operation.

The incident laser beam may therefore be greatly, or even totally, absorbed and therefore may lead to a substantial reduction in the penetration depth, or even in a loss of coupling between the beam and the material and therefore a momentary interruption in the welding process.

The power density threshold at which the plasma appears depends on the ionization potential of the shielding gas used and is inversely proportional to the square of the wavelength of the laser beam.

Thus, it is very difficult to weld under pure argon with a $CO_2$-type laser, whereas this operation may be carried out with very much less of a problem with a YAG-type laser.

In general, in $CO_2$ laser welding, helium is used as shielding gas, this being a gas with a high ionization potential and making it possible to prevent the appearance of the shielding gas plasma, and to do so irrespective of the laser beam power employed.

However, helium has the drawback of being an expensive gas and many laser users prefer to use other gases or gas mixtures that are less expensive than helium but which would nevertheless limit the appearance of the shielding gas plasma and therefore obtain welding results similar to those obtained with helium, but at a lower cost.

Thus, gas mixtures are commercially available that contain argon and helium, for example the gas mixture containing 30% helium by volume and the rest being argon, sold under the name LASAL™ 2045 by L'Air Liquide™, which make it possible to achieve substantially the same results as helium, for $CO_2$ laser power levels below 5 kW and provided that the power densities generated are not too high, that is to say above about 2000 kW/cm$^2$.

However, the problem that arises with this type of Ar/He mixture is that it is no longer suitable for higher laser power densities, since the threshold at which the shielding gas plasma is created is then exceeded.

It is an object of the present invention therefore to solve this problem by proposing an improved laser welding process that can employ lasers with a power exceeding 15 to 20 kW and to do so, with no or minimal shielding gas plasma formation, irrespective of the power or power density chosen.

SUMMARY

The solution of the invention is therefore a laser beam welding process employing a shielding gas mixture containing nitrogen and helium, in which the proportion of nitrogen and/or helium in said gas mixture is chosen or adjusted according to the power or power density of said laser beam.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
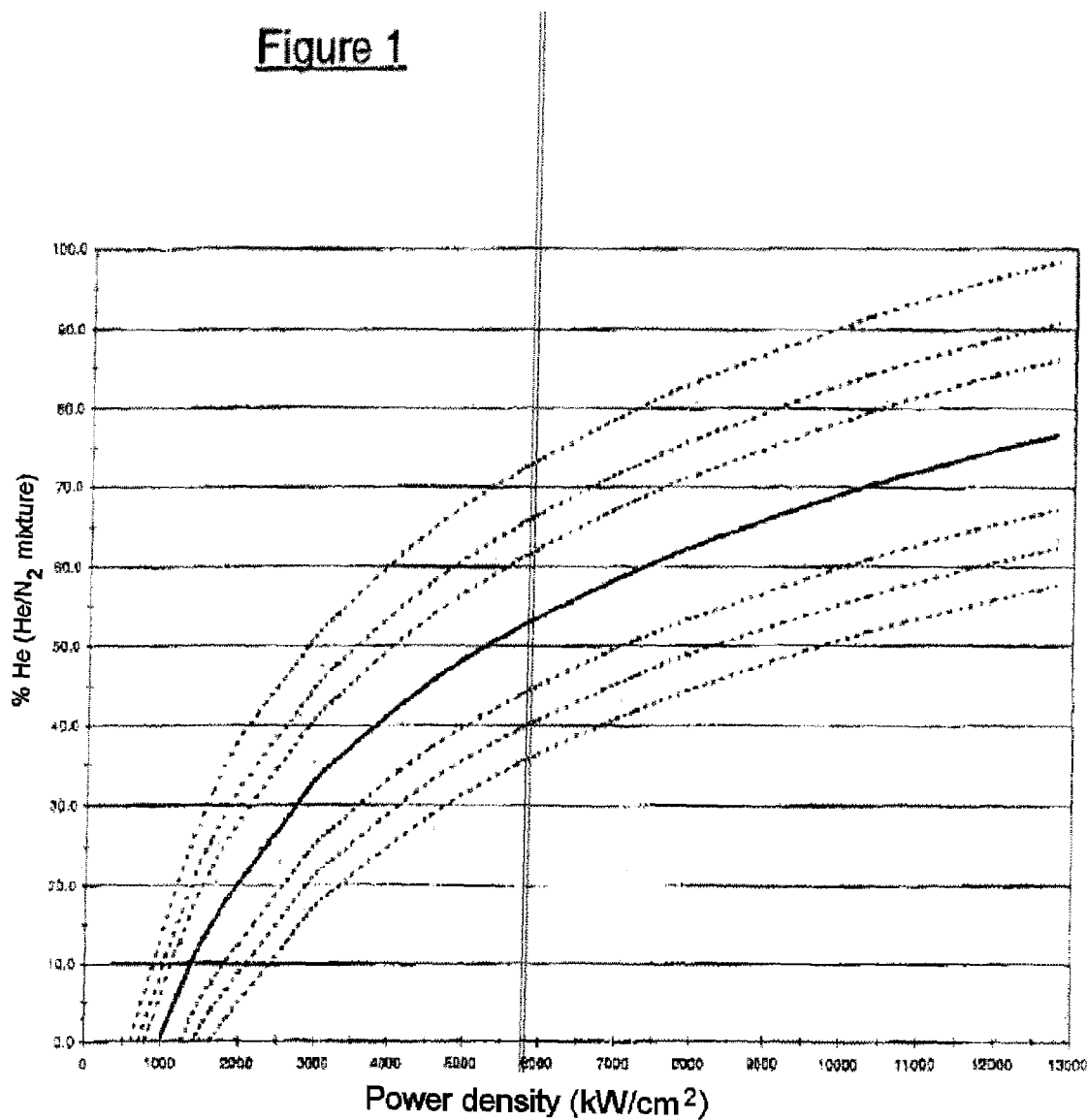
FIG. 1 illustrates threshold levels for the appearance of plasma in the shielding gas, as a function of the helium content in nitrogen and of the laser's power density.

The solution of the invention is therefore a laser beam welding process employing a shielding gas mixture containing nitrogen and helium, in which the proportion of nitrogen and/or helium in said gas mixture is chosen or adjusted according to the power or power density of said laser beam.

Depending on the case, the process of the invention may include one or more of the following technical features:
- the laser power is between 0.5 kW and 30 kW, preferably between 5 kW and 20 kW;
- the shielding gas mixture consists of nitrogen and/or helium; preferably, the gas mixture contains a helium volume proportion of 30% to 80%, the remainder being nitrogen and possibly inevitable impurities;
- the gas mixture is produced on site, by mixing defined amounts of nitrogen and helium;

the gas mixture is produced by means of a gas mixer system slaved to the laser power or power density employed so as to mix controlled amounts of nitrogen and helium;

the proportion of helium in the gas mixture is increased when the laser power or power density is increased.

According to another aspect, the invention also relates to a laser beam welding process employing a shielding gas mixture containing helium and nitrogen, in which the proportion of helium relative to the proportion of nitrogen in said gas mixture is chosen or adjusted according to the power or power density of said laser beam so as to avoid or minimize plasma formation in the shielding gas during welding.

According to another aspect, the invention also relates to a laser beam welding process employing a shielding gas mixture containing helium and nitrogen, in which the volume proportion of helium in said gas mixture is:

between 1 and 30% for a laser beam power of between 0.5 kW and 4 kW;

between 30 and 50% for a laser beam power of between 4 kW and 8 kW; and/or between 50 and 70% for a laser beam power of between 8 kW and 12 kW.

Moreover, the invention also relates to a laser beam welding process employing a shielding gas mixture containing helium and nitrogen, in which the volume proportion of helium in said gas mixture is:

between 1 and 30% for a laser beam power density of between 500 $kW/cm^2$ and 2000 $kW/cm^2$;

between 30 and 50% for a laser beam power density of between 2000 $kW/cm^2$ and 4000 $kW/cm^2$; and/or between 50 and 70% for a laser beam power density of between 4000 $kW/cm^2$ and 10000 $kW/cm^2$.

The helium and nitrogen preferably come from a single gas source in which the helium and nitrogen are premixed in the desired proportions, for example, by means of a gas mixer.

The invention also relates to a laser beam welding installation employing a shielding gas mixture containing nitrogen and helium, comprising:

at least one nitrogen source;

at least one helium source;

gas mixing means allowing the nitrogen coming from the nitrogen source to be mixed with the helium coming from the helium source;

a laser generator device delivering a laser beam having a laser power of at least 0.5 kW; and regulating means that cooperate with said gas mixing means so as to adjust the proportions of nitrogen and/or helium according to the laser power delivered by the laser device.

Furthermore, the invention also relates to a laser beam welding process employing a shielding gas mixture containing helium and nitrogen, in which the volume proportion of helium (% He) in said gas mixture as a function of the power density is such that:

$$28 \times In(\Phi_P) - 207 \leq \% \, He \leq 32.3 \times In(\Phi_P) - 207$$

in which:

$In(\Phi_P)$ represents the natural logarithm of the power density expressed in $kW/cm^2$; and % He represents the volume percentage of helium in nitrogen of the gas mixture.

Preferably, the volume proportion of helium (% He) in said gas mixture as a function of the power density is such that:

$$28.5 \times In(\Phi_P) - 207 \leq \% \, He \leq 31.5 \times In(\Phi_P) - 207.$$

Also preferably, the volume proportion of helium (% He) in said gas mixture as a function of the power density is such that:

$$29 \times In(\Phi_P) - 207 \leq \% \, He \leq 31 \times In(\Phi_P) - 207.$$

A greater understanding of the invention will now be gained from the explanations given below with reference to the appended figure.

As explained above, in laser beam welding, a major problem that arises is associated with the creation of a shielding gas plasma harmful to the welding operation by the strong, or even total, absorption of the laser beam that it generates, and thus results in an appreciable reduction in the penetration depth, or even in a loss of coupling between the laser beam and the material to be welded, and therefore in an interruption in the welding process.

Now, the inventors of the present invention have demonstrated that the threshold for the appearance of the shielding gas plasma is determined, for a given $CO_2$-type laser power density, by the volume proportion of helium (relative to that of nitrogen) in the helium/nitrogen gas mixture used as shielding gas during the welding operation and that this proportion of helium has to be varied according to the power density of the laser.

Thus, FIG. 1 shows (curve A) the change in the threshold appearance of plasma as a function of the power density (plotted on the x-axis) and of the volume proportion of helium (plotted on the y-axis) in the mixture formed from nitrogen and helium, the sum of the nitrogen and helium contents constituting 100% by volume of the mixture.

Curve A was obtained by analysis of the depth of penetration of the weld beads produced with various helium contents in the mixture and by visual examination of the appearance, or nonappearance, of the shielding gas plasma during the welding process.

The power density was obtained by dividing the laser power on the workpiece by the diameter of the focal spot obtained with the laser in question, measured beforehand by means of a laser beam analyzer.

The region lying above curve A represents the region in which, for the power density in question, the helium content in the nitrogen allows a weld bead to be produced without shielding gas plasma appearing.

In the region lying below curve A, the shielding gas breaks down and therefore a shielding gas plasma is present.

In order to indicate the uncertainties associated with measuring the diameter (in microns) of the focal spot, with that of the helium content in the nitrogen/helium mixture and with that regarding the energy distribution within the focal spot, three bundles of curves (B, C), (D, E) and (F, G) have also been shown in FIG. 1.

The equations of these curves are of the type:

$$\% \, He = \mu \times In(\psi_P) - 207$$

in which:

$In(\Phi_P)$ represents the natural logarithm of the power density expressed in $kW/cm^2$;

% He is the helium percentage in the nitrogen; and

μ is a value that depends on the curve in question: μ=31 for curve B; μ=29 for curve C; μ=31.5 for curve D; μ=28.5 for curve E; μ=32.3 for curve F; and μ=28 for curve G.

Thus, within the area of the drawing lying between curves F and G (or alternatively D and E or B and C), it is possible to choose, for the power density in question, the $N_2$/He mixture that makes it possible to obtain the same performance as either pure helium or as a $N_2$/He mixture located above the region lying between curves F and G (or alternatively D and E or B and C).

Conversely, below this region the shielding gas always breaks down and therefore a shielding gas plasma appears. The gas mixture determined from these curves is therefore the optimum mixture, that is to say the one which contains the least helium but which gives, however, substantially the same results as pure helium or as a mixture with a higher proportion of helium.

All these curves were produced at a welding speed of 3 m/min on steel and stainless steel workpieces with a parabolic mirror of 250 mm, 200 mm or 150 mm focal length, and using a $CO_2$ laser whose Q-factor was 4.

As shown in FIG. 1, a helium/nitrogen mixture containing 50% by volume of nitrogen gives penetration depths and welding speeds that are approximately the same as for pure helium for a $CO_2$ laser power density of $5.3 \times 10^6$ W/cm$^2$.

Figure 2:
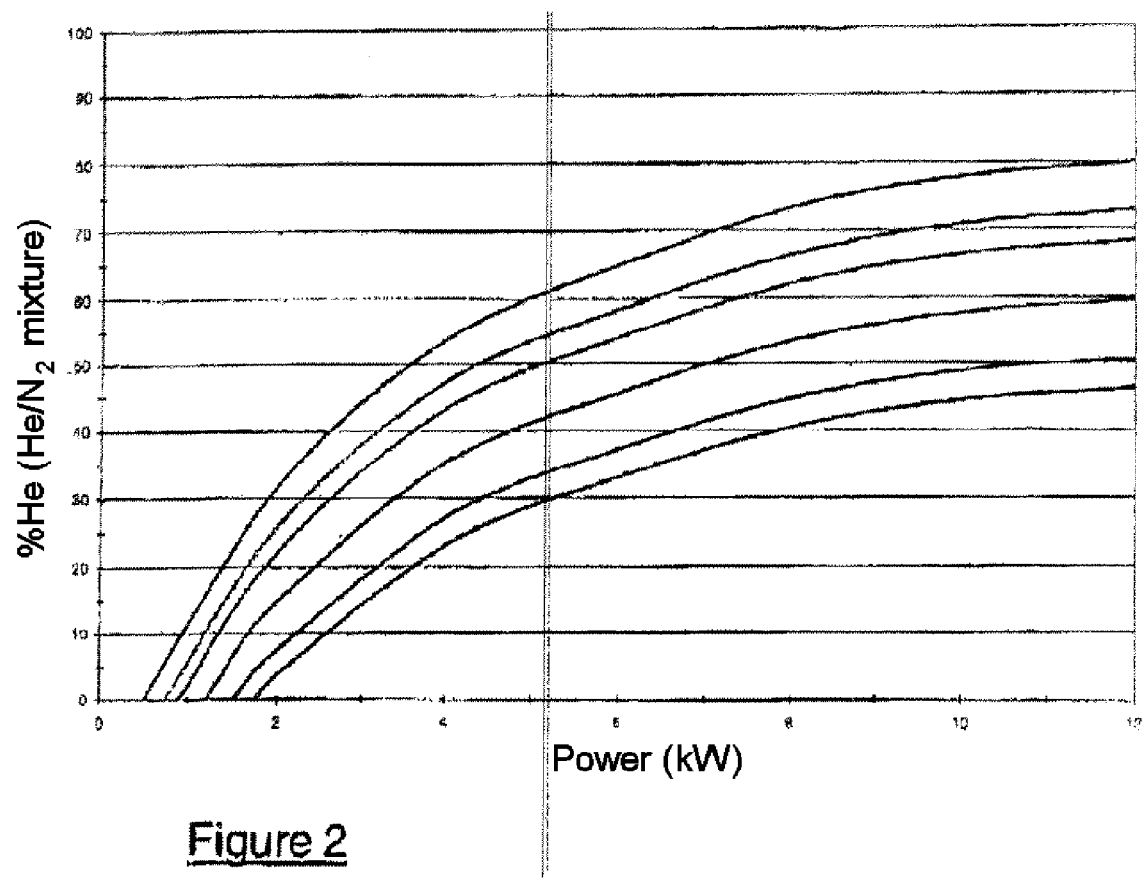
FIG. 2 illustrates threshold levels for the appearance of plasma in the shielding gas, as a function of the helium content in nitrogen and of the laser's power.

The invention may also be demonstrated by showing the change in the threshold for the shielding gas plasma to appear as a function of the helium content in nitrogen and of the laser power employed, as shown diagrammatically in FIG. 2.

This other representation, less general than the previous one, may be obtained from the curves of FIG. 1 and using the following equations:

$$\Phi_P = P/S \quad (1)$$

where $\Phi_P$ is the power density, P is the laser power used and S is the area of the focal spot;

$$S = \pi W_0^2 \quad (2)$$

where $W_0$ is the radius of the focal spot; and $$W_0 W_F = M^2 (\lambda f / \pi) \quad (3)$$

where $W_F$ is the radius of the laser beam at the mirror or at the focusing lens for the power in question, $M^2$ is the Q-factor of the laser beam, which in general is a manufacturer's datum ($M^2=1$ for a Gaussian beam), $\lambda$ is the wavelength of the laser beam (10.6 μm in the case of a $CO_2$ laser) and f is the focal length of the mirror or of the focusing lens.

Thus, it is possible to switch from a power density representation (FIG. 1) to a power representation (FIG. 2), and vice versa, using the above equations, in order to determine on the basis of the power or power density used the corresponding nitrogen/helium mixture.

FIG. 2 was obtained in this case from the curves of FIG. 1, and for a Q-factor of 4, a focal length of 200 mm and a beam diameter at the focusing mirror of 28 mm.

Thus, at 6 kW, with a focal length of 200 mm, for a laser of 4 Q-factor and a beam diameter at the focusing mirror of 200 mm, it is possible to use a nitrogen/helium mixture containing 50% by volume of each of these components.

The present invention is therefore based on the fact that the $N_2$/He gas mixture is adapted or adjusted according to the laser power or power density used in order to obtain a high-quality weld and for reduced cost, without shielding gas plasma generation or else with as little plasma generation as possible.

According to the invention, the proportions of the components in the gas mixture may be adjusted on the basis of the volume, molar or mass proportions; however, a volume adjustment is preferred as it is simpler to implement.

Starting from this basis, the invention may be implemented by producing a range of gas mixtures in bottles, that is to say in packaged form, with a variable helium content in the nitrogen adapted according to the laser power or power density.

For example, the table below gives three different $N_2$/He mixtures adapted to three respective ranges of laser power density recommended for implementing the invention.

| Composition of the $N_2$/He gas mixture (expressed as vol % of He) | Recommended laser power density ranges |
| --- | --- |
| $N_2$ + 30% He | 500 to 2000 kW/cm$^2$ |
| $N_2$ + 50% He | 2000 to 4000 kW/cm$^2$ |
| $N_2$ + 70% He | 4000 to 10 000 kW/cm$^2$ |

Depending on the case, the invention may also be used directly on site by an operator, before the start of welding, for example on the basis of a source of helium and nitrogen, the $N_2$/He gas mixture most suited to the power density or to the power of the laser used, and according to the specifications of the figure appended hereto.

Figure 3:
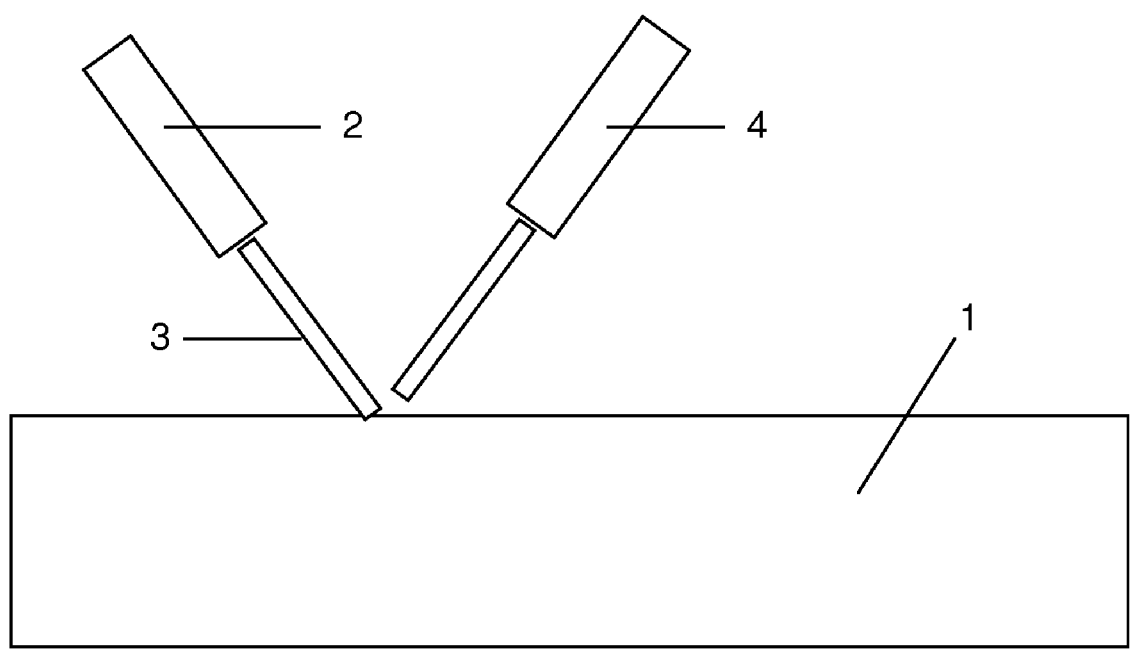
FIG. 3 illustrates the workpiece being welded according to an aspect of the disclosed method.

Alternatively, and as best illustrated by FIG. 3, the desired $N_2$/He mixture may also be obtained by automatic slaving of the gas mixer 4 according to the power or power density of the laser 2 used and by using the curve of the figure appended hereto as calibration curve, wherein laser 2 directed a laser beam 3 towards a workpiece to be welded 1.

The laser welding process of the invention is particularly suitable for welding workpieces made of aluminum or aluminum alloys, stainless steel or mild steel.

The laser welding process of the invention may be used for welding workpieces of the same or different thickness ranges between 0.1 mm and 300 mm.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for laser beam welding with a shielding gas mixture, said mixture comprising helium and nitrogen, wherein the volume proportion of said helium in said mixture comprises about 1% to about 30% for a laser beam power density of about 500 kW/cm$^2$ to about 2000 kW/cm$^2$.

2. A method of laser beam welding with a shielding gas mixture comprising helium and nitrogen, wherein the volume proportion of said helium in said mixture is a function of the power density such that:

$$28 \times \ln(\Phi_P) - 207 \leq \% \text{ He} \leq 32.3 \times \ln(\Phi_P) - 207$$

wherein:
  a) $\ln(\Phi_P)$ represents the natural logarithm of said power density expressed in kW/cm$^2$; and
  b) % He represents the volume percentage of helium in nitrogen of said gas mixture.

3. The process of claim 2, wherein said volume proportion of said helium in said mixture is a function of said power density such that:

$$28.5 \times \ln(\Phi_P) - 207 \leq \% \text{ He} \leq 31.5 \times \ln(\Phi_P) - 207.$$

4. The process of claim 3, wherein said volume proportion of said helium in said mixture is a function of said power density such that:

$$29 \times \ln(\Phi_P) - 207 \leq \% \text{ He} \leq 31 \times \ln(\Phi_P) - 207.$$

5. The method of claim 2, wherein said mixture consists essentially of:

a) a helium volume proportion of about 30% to about 80%; and b) a nitrogen volume proportion of about 20% to about 70%.

6. A method of laser beam welding with a shielding gas mixture, said mixture comprising helium and nitrogen, wherein the volume proportion of said helium in said mixture comprises about 30% to about 50% for a laser beam power density of about 2000 kW/cm$^2$ to about 4000 kw/cm$_2$.

7. A method of laser beam welding with a shielding gas mixture, said mixture comprising helium and nitrogen, wherein the volume proportion of said helium in said mixture comprises about 50% to about 70% for a laser beam power density of about 4000 kW/cm$^2$ to about 10000 kw/cm$^2$.

* * * * *